United States Patent [19]

Selapack

[11] Patent Number: 5,913,523
[45] Date of Patent: Jun. 22, 1999

[54] TRANSMISSION LEAK REPAIR PROCESS AND PLATE THEREFOR

[76] Inventor: Leon C. Selapack, 9613 Colby, Corfu, N.Y. 14036

[21] Appl. No.: 08/865,206

[22] Filed: May 29, 1997

Related U.S. Application Data

[60] Provisional application No. 60/018,888, May 30, 1996.

[51] Int. Cl.⁶ .................................................. F16H 57/02
[52] U.S. Cl. .................... 277/632; 29/402.02; 74/606 R; 277/914
[58] Field of Search .......................... 29/402.02, 402.12, 29/402.18, 402.03, 402.09, 402.14, 402.15; 277/312, 313, 500, 598, 630, 632, 914, 921; 74/606 R; 285/205, 139.1, 142.1; D8/399; D15/149; 49/482.1, 483.1; 403/335, 337

[56] References Cited

U.S. PATENT DOCUMENTS

| | | | |
|---|---|---|---|
| 1,659,677 | 2/1928 | Welsh ....................................... | 277/630 |
| 3,147,544 | 9/1964 | Connors, Sr. et al. ............. | 277/500 X |
| 4,087,098 | 5/1978 | Alley ................................. | 29/402.02 X |
| 4,817,846 | 4/1989 | Eichinger ............................. | 277/914 X |
| 5,203,066 | 4/1993 | McDonald ........................ | 29/402.12 X |
| 5,562,294 | 10/1996 | Marsi ................................... | 277/914 X |
| 5,608,958 | 3/1997 | Stockton .......................... | 29/402.02 X |
| 5,645,363 | 7/1997 | Daffron et al. ..................... | 403/335 X |

*Primary Examiner*—Anthony Knight
*Assistant Examiner*—Greg Binda
*Attorney, Agent, or Firm*—James C. Simmons

[57] ABSTRACT

A method and device for repairing a leak between a channel member through which an axle passes and a cover member of a vehicular transmission or otherwise between inner and outer members. The diameter of the opening in the cover member for the axle is greater than the diameter of the channel through the channel member thereby providing a surface portion of the channel member which is uncovered by the cover member. A plate is installed to sealingly bear against both the cover member and the uncovered surface of the channel member, with sealing material disposed between the bearing surfaces. The plate, which has an aperture for also receiving the axle, has a first surface for sealingly bearing against the uncovered surface of the channel member. This first surface is raised (axially inwardly from) from a second surface which sealingly bears against the cover member. In order to eliminate the necessity otherwise of removing the axle, the plate is alternatively a split plate.

14 Claims, 2 Drawing Sheets

TRANSMISSION LEAK REPAIR PROCESS AND PLATE THEREFOR

Priority of U.S. Provisional patent application Ser. No. 60/018,888, filed May 30, 1996, the disclosure of which is hereby incorporated by reference, is claimed.

The present invention relates generally to the repair of automotive or other vehicular transmissions such as the General Motors GM-440-T4 (4T60) and GM-440-T4 (4T60-E) transmissions.

A gasket usually made from a cork substance is originally provided between the side cover and channel casting (through which the axle extends) of such a General Motors transmission. If this gasket fails, a transmission oil leak will develop between the side cover and channel casting near the left axle seal.

Replacement of this cork gasket requires removal of the side cover, which requires lowering of the transmission or its removal from the vehicle, this being time consuming and therefore costly to the customer. Since such a leak problem typically occurs when the vehicle is getting older, the customer would desirably like to have the leak repaired but at minimal cost.

It is therefore an object of the present invention to reduce the time and cost of repairing such a leak.

The above and other objects, features, and advantages of the present invention will be found in the following detailed description of the preferred embodiments thereof when read in conjunction with the appended drawings wherein the same reference numerals denote the same or similar parts throughout the several views.

DETAILED DESCRIPTION OF PREFERRED EMBODIMENTS

The following description of the invention is in such full, clear, concise, and exact terms as to enable any person skilled in the art to which it pertains, or with which it is most nearly connected, to make and use the same.

Figure 1:
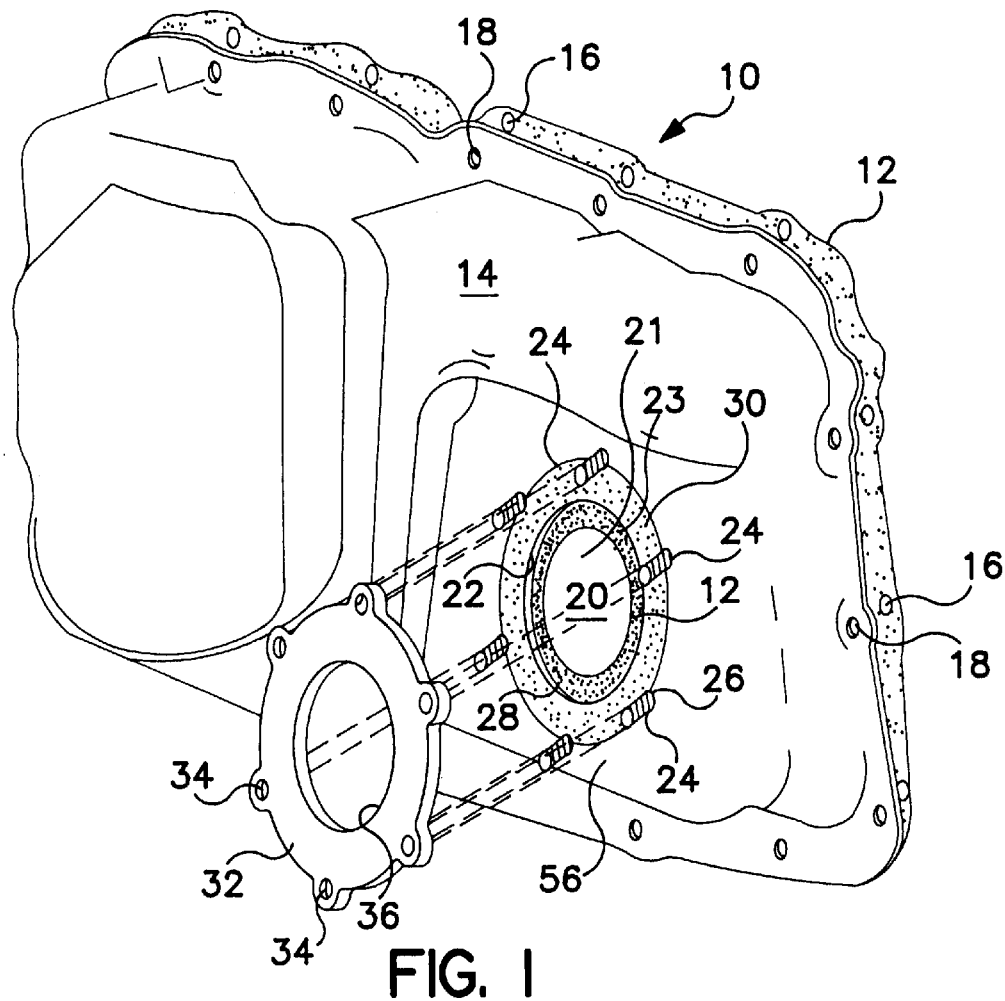
FIG. 1 is a perspective view of a portion of a vehicle transmission, with the axle removed, illustrating leak repair in accordance with the present invention.

Referring to FIG. 1, there is illustrated generally at 10 a portion of an automobile transmission including an inner member or channel casting 12 on which an outer member or side cover 14 is secured by means of fasteners such as studs or bolts or screws receivable in apertures 16 and 18 respectively. For ease of illustration, the cover 14 is shown unconnected to the channel casting 12. The channel casting 12 is formed to provide a channel, illustrated at 20, and the cover 14 formed to have an opening, illustrated at 22, aligned therewith for passage of the axle (not shown). It should be noted that the opening 22 has a greater diameter than that of the channel 20 (at the channel end, seen at 21 in FIG. 1, which is adjacent the cover 14), leaving an exposed surface portion, illustrated at 23, of the channel casting 12 around the channel 20 which is uncovered by the cover member 14.

In such an assembly 10, a gasket of cork-like material may be originally provided between the channel casting 12 and the cover 14 and around the edge of the circular opening 22. This gasket is held in place by a plurality of perhaps six circumferentially-spaced studs, illustrated at 24, threadedly received in the channel casting 12 and which extend through apertures (not shown) in the gasket then through apertures, illustrated at 26, in the cover 14, and are then engaged my nuts and washers (not shown). Thus, this gasket would not be visible in FIG. 1. Removal and replacement of this gasket in the event of leakage would necessitate removal of the cover 14, which requires lowering of the transmission or its removal from the vehicle, and this would be a time-consuming and therefore costly process.

In order to quickly and inexpensively repair a leak resulting from deterioration of such a gasket, in accordance with the present invention, the cover 14 as well as the original cork gasket is left in place so that the repair, as described hereinafter, may be made with the transmission still in place on the vehicle. The repair is made in accordance with the present invention by applying a ring of a suitable sealing material, illustrated at 28, such as, for example, R.T.V. silicon (preferred), cork, or any other suitable sealing material, on the channel casting 12 around the channel 20, and a second ring of the sealing material, illustrated at 30, on the cover 14 around the opening 22. Then a plate 32, composed of steel or other suitable material and having a plurality of circumferentially-spaced apertures, illustrated at 34, for receiving the studs 24 respectively, is provided to engage and sealingly bear against the channel casting and against the cover member with the sealing material 28 and 30 respectively disposed therebetween so that the plate and sealing material together act as a seal to prevent the leakage. The plate 32 has a circular inner passage or aperture, illustrated at 36, for the axle. The plate, which may have a thickness, illustrated at 50, of, for example, 0.06 inch, has an inner edge, illustrated at 52, defined by the aperture 36, and an outer edge, illustrated at 54. The plate sizing is determined chiefly by the relevant dimensions of the particular transmission assembly undergoing repair and can be determined using principles of common knowledge to one of ordinary skill in the art to which this invention pertains.

Figure 3:
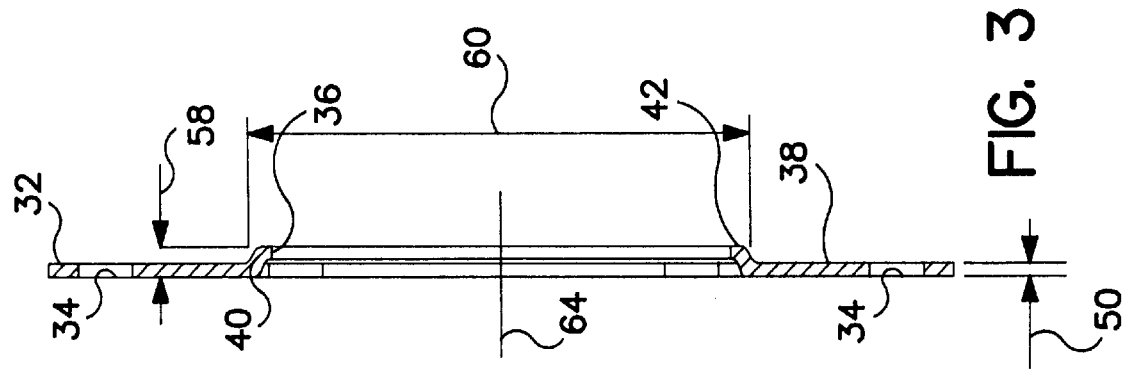
FIG. 3 is a section view of the plate taken along lines 3—3 of FIG. 2.
Figure 2:
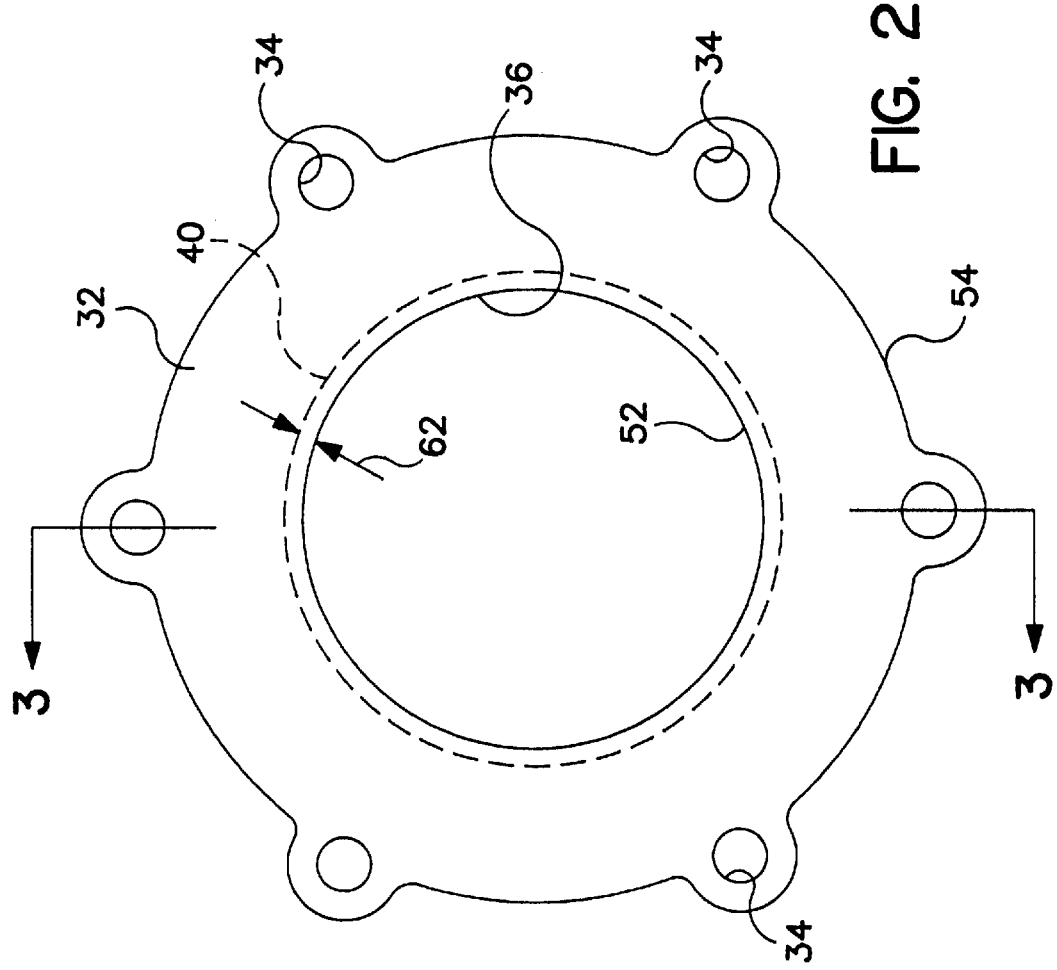
FIG. 2 is a plan view of a plate for the leak repair.

As seen in FIG. 1, the outer surface portion, illustrated at 56, of the cover 14 (which is adjacent the cover opening 22) is axially as well as radially outwardly of the outer surface portion 23 of the channel casting 12. Referring to FIGS. 2 and 3, in order to effect the necessary pressure against both the cover 14 and channel casting 12, the plate 32 is suitably formed to have a first surface portion, illustrated at 38, for engaging the cover 14 (the surface portion 56 thereof) and is further formed to have a circular rib, illustrated at 40, around the passage 36. The rib has a radially outer diameter, illustrated at 60, of, for example, about 3.12 inches. The rib extends axially inwardly a distance, illustrated at 58, of, for example, about 0.187 inch providing a second surface portion, illustrated at 42, having a width, illustrated at 62 of, for example, about 0.25 inch, which is raised relative to the first surface portion 38 (so that it will be axially inwardly of the first surface portion 38 when the plate 32 is installed) for suitably engaging the surface portion 23 of the channel casting 12. The radially inner diameter of the rib may thus be, for example, about 2.62 inches. As used herein, the terms "axial" and "axially" are meant to refer to distance or direction along the axis or centerline, illustrated at 64, of the passage 36, and the terms "radial" and "radially" are meant to refer to distance or direction toward or away from the axis 64. The plate 32 may of course have other sizes which are suitable for the particular transmission assembly undergoing repair.

In order to quickly and inexpensively repair a leak due to a deteriorated original gasket in accordance with the present invention, the transmission is left in place on the vehicle, and the axle is removed. The nuts and washers are removed from the studs 24. The exposed surface portion 23 of the channel casting 12 and the surface portion 56 of the cover 14 that the plate 32 will sealingly engage are then cleaned and the sealing material 28 and 30 applied to these surfaces. The plate 32 is then installed with the studs 24 received in the plate apertures 34 respectively and the original nuts (and, if desired, washers) reinstalled and tightened so as to provide seals between the plate 32 and the channel casting 12 and cover 14 thereby acting instead of the original gasket to prevent leakage from between the channel casting and the cover.

Figure 4:
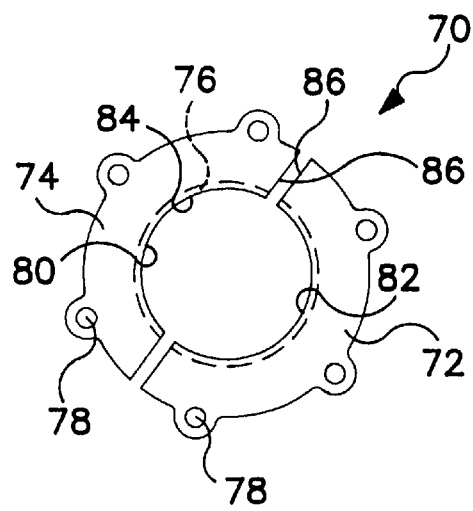
FIG. 4 is a plan view of an alternative embodiment for the plate.

In accordance with an alternative embodiment of the present invention, the plate may be formed as a split plate so that it would be unnecessary to remove the axle in order to repair the leak. Thus, referring to FIG. 4, there is shown at 72 and 74 a pair of plate portions which together comprise a split plate, illustrated generally at 70, which has an aperture 80, similar to aperture 36, a rib 76, similar to rib 40, circumferentially apaced apertures 78, similar to apertures 34, and is otherwise similar to plate 32. As seen in FIG. 4, the plate 70 is split or divided into the two (or more) portions 72 and 74 each of which defines part of the aperture 80. Thus, plate portion 72 defines aperture part 82, and plate portion 74 defines aperture part 84. When the plate portions 72 and 74 are installed about the axle, which accordingly need not be removed, the radially extending edges 86 thereof generally abut each other respectively, as seen in FIG. 4.

It should be understood that, while the invention has been described in detail herein, the invention can be embodied otherwise without departing from the principles thereof, and such other embodiments are meant to come within the scope of the present invention as defined in the appended claims.

What is claimed is:

1. A method for repairing a leak between an inner and an outer member comprising installing a plate to sealingly bear against a surface portion of the inner member and a surface portion of the outer member, wherein the inner member is a portion of a vehicular transmission which is formed to have a channel through which an axle extends, and the outer member is a cover removably attachable to the inner member and which is formed to have an opening through which the axle also extends, the opening having a diameter which is greater than the diameter of the channel at its end which is adjacent the outer member thereby defining the inner member surface portion which is uncovered by the outer member so that the plate can sealingly bear against it.

2. A method according to claim 1 further comprising selecting the plate to have an aperture for receiving the axle and to have first and second surfaces which are axially spaced for sealingly bearing against the inner and outer member surface portions, which are also axially spaced, respectively.

3. A method according to claim 1 comprising applying a sealing material between the plate and the inner member surface portion and between the plate and the outer member surface portion.

4. A method for repairing a leak between an inner and an outer member comprising installing a plate to sealingly bear against a surface portion of the inner member and a surface portion of the outer member, and selecting the plate to have an aperture for receiving an axle and at least two portions each of which defines part of the aperture.

5. A method according to claim 4 further comprising selecting the plate to have first and second surfaces which are axially spaced for sealingly bearing against the inner and outer member surface portions, which are also axially spaced, respectively.

6. A method according to claim 4 comprising applying a sealing material between the plate and the inner member surface portion and between the plate and the outer member surface portion.

7. A device for repairing a leak between a channel member through a channel of which an axle extends and a cover member having an opening through which the axle extends of a vehicular transmission, the diameter of the opening being greater than the channel diameter at the channel end which is adjacent the cover member whereby a surface portion of the channel member around the channel end is uncovered by the cover member, the device comprising a plate means having inner edge means defining an aperture for receiving the axle and further having outer edge means, means defining a first surface portion adjacent said inner edge means for sealingly engaging the channel member surface portion, means defining a second surface portion adjacent said outer edge means for sealingly engaging said cover member, means for raising said first surface portion with respect to said second surface portion, and means for attaching said plate means to the transmission so that said first and second surface portions of said plate means sealingly engage said channel member surface portion and said cover member respectively, wherein said plate means comprises at least two portions each of which defines part of the aperture.

8. A device according to claim 7 wherein said attaching means comprises a plurality of hole means spaced around the aperture for receiving fasteners which attach the cover plate to the channel member.

9. In a vehicular transmission which includes a channel member having means defining a channel for passage therethrough of an axle, and a cover member having means defining an opening for passage therethrough of the axle, the opening having a diameter which is greater than a diameter of the channel at an end thereof which is adjacent said cover member thereby defining a channel member surface portion which is uncovered by said cover member, means for sealing against leakage from between said channel member and said cover member, said sealing means comprising plate means having an outer edge, means defining an aperture in said plate means for receiving the axle and defining an inner edge of said plate means, means defining a first surface portion on said plate means and adjacent said inner edge for sealingly bearing against said channel member surface portion, means defining a second surface portion on said plate means and adjacent said outer edge for sealingly bearing against said cover member, and means for attaching said plate means to the transmission so that said first and second surface portions of said plate means sealingly bear against said channel member surface portion and said cover member respectively, and wherein said plate means comprises at least two portions each of which defines part of the aperture.

10. A transmission according to claim 9 further comprising means for raising said first surface portion relative to said second surface portion.

11. A transmission according to claim 9 wherein said attaching means comprises a plurality of hole means spaced around the aperture for receiving fasteners which attach the cover plate to the channel member.

12. In a vehicular transmission which includes a channel member having means defining a channel for passage therethrough of an axle, and a cover member having means defining an opening for passage therethrough of the axle, the opening having a diameter which is greater than a diameter of the channel at an end thereof which is adjacent said cover member thereby defining a channel member surface portion which is uncovered by said cover member, means for sealing against leakage from between said channel member and said cover member, said sealing means comprising plate means having an outer edge, means defining an aperture in said plate means for receiving the axle and defining an inner edge of said plate means, means defining a first surface portion on said plate means and adjacent said inner edge for sealingly bearing against said channel member surface portion, means defining a second surface portion on said plate means and adjacent said outer edge for sealingly bearing against said cover member, means for attaching said plate means to the transmission so that said first and second surface portions of said plate means sealingly bear against said channel member surface portion and said cover member respectively, sealing material disposed between said plate means and said channel member surface portion, and sealing material disposed between said plate means and said cover member.

13. A transmission according to claim 12 further comprising means for raising said first surface portion relative to said second surface portion.

14. A transmission according to claim 12 wherein said attaching means comprises a plurality of hole means spaced around the aperture for receiving fasteners which attach the cover plate to the channel member.

* * * * *